(12) United States Patent
Koizumi

(10) Patent No.: US 10,014,009 B1
(45) Date of Patent: Jul. 3, 2018

(54) MAGNETIC DISK DRIVE AND RECORDING HEAD CONTROL METHOD

(71) Applicants: Kabushiki Kaisha Toshiba, Minato-ku, Tokyo (JP); Toshiba Electronic Devices & Storage Corporation, Minato-ku, Tokyo (JP)

(72) Inventor: Gaku Koizumi, Yokohama Kanagawa (JP)

(73) Assignees: Kabushiki Kaisha Toshiba, Tokyo (JP); Toshiba Electronic Devices & Storage Corporation, Tokyo (JP)

( * ) Notice: Subject to any disclaimer, the term of this patent is extended or adjusted under 35 U.S.C. 154(b) by 0 days.

(21) Appl. No.: 15/884,696

(22) Filed: Jan. 31, 2018

(30) Foreign Application Priority Data

Aug. 29, 2017 (JP) .................................. 2017-164470

(51) Int. Cl.
  *G11B 5/127* (2006.01)
  *G11B 5/00* (2006.01)

(52) U.S. Cl.
  CPC .... *G11B 5/1278* (2013.01); *G11B 2005/0024* (2013.01)

(58) Field of Classification Search
  CPC ............... G11B 2005/0002–2005/0005; G11B 2005/0021–2005/0032; G11B 5/012; G11B 5/02; G11B 5/1278; G11B 5/187; G11B 5/245–5/2457
  USPC ............................. 360/46, 55, 59, 67–69, 75, 360/119.02–119.04, 125.31
  See application file for complete search history.

(56) References Cited

U.S. PATENT DOCUMENTS

| 8,582,225 | B2 | 11/2013 | Shiimoto et al. |
| 8,643,972 | B2* | 2/2014 | Shiroishi ............. G11B 5/3146 360/59 |
| 8,760,779 | B2* | 6/2014 | Johns ................... G11B 5/1278 360/59 |
| 8,896,947 | B2* | 11/2014 | Koizumi ................ G11B 5/40 360/59 |
| 8,976,633 | B1 | 3/2015 | Ruan et al. |
| 9,007,723 | B1* | 4/2015 | Igarashi ................ G11B 5/314 360/125.3 |
| 9,105,279 | B2* | 8/2015 | Shiroishi ................ G11B 5/02 |
| 9,123,370 | B1 | 9/2015 | Ruan et al. |
| 9,159,360 | B2* | 10/2015 | Shiroishi ............ G11B 20/1217 |

(Continued)

FOREIGN PATENT DOCUMENTS

JP 2014-086122 A 5/2014

*Primary Examiner* — Wayne Young
*Assistant Examiner* — James L Habermehl
(74) *Attorney, Agent, or Firm* — White & Case LLP

(57) ABSTRACT

According to one embodiment, a magnetic disk drive records and reproduces referential data and measures a referential characteristic value in a state in which supply of a STO voltage is stopped, executes control of reducing a temperature set value of a heater at a recording operation, based on the referential characteristic value, records and reproduces corrected data and measuring a corrected characteristic value in a state of supplying the STO voltage with a polarity opposite to a polarity at a general operation, while varying the temperature set value at a recording operation, compares the referential characteristic value with the corrected characteristic value and obtaining a difference, and corrects the temperature set value based on the difference.

8 Claims, 11 Drawing Sheets

(56) References Cited

U.S. PATENT DOCUMENTS

| | | | |
|---|---|---|---|
| 9,275,672 B2* | 3/2016 | Shiroishi | G11B 5/1278 |
| 9,305,584 B2* | 4/2016 | Koizumi | G11B 5/02 |
| 9,472,225 B2 | 10/2016 | Lou et al. | |
| 9,691,415 B2* | 6/2017 | Koui | G11B 5/012 |
| 2014/0118861 A1 | 5/2014 | Funayama | |

* cited by examiner

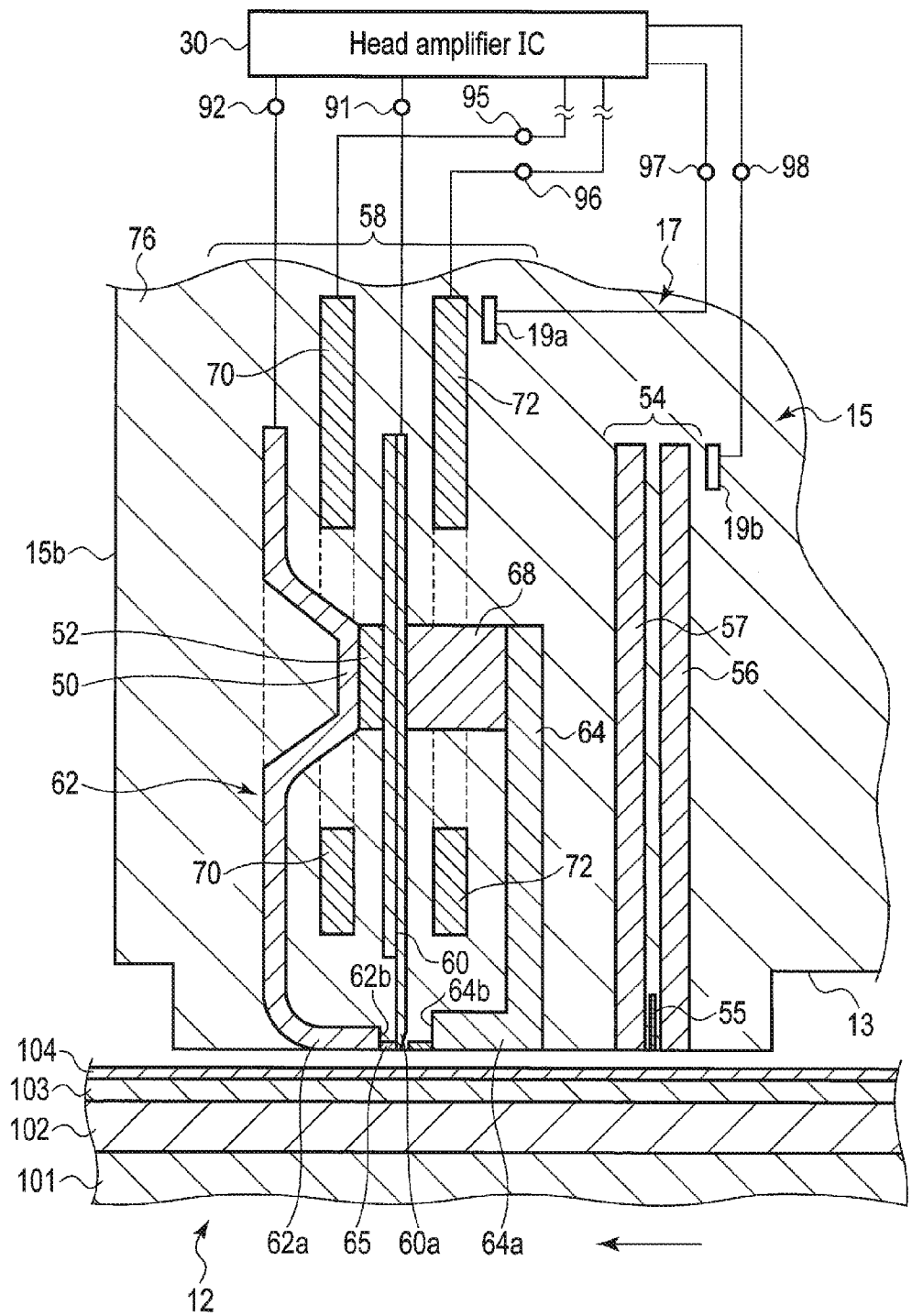
F I G. 3

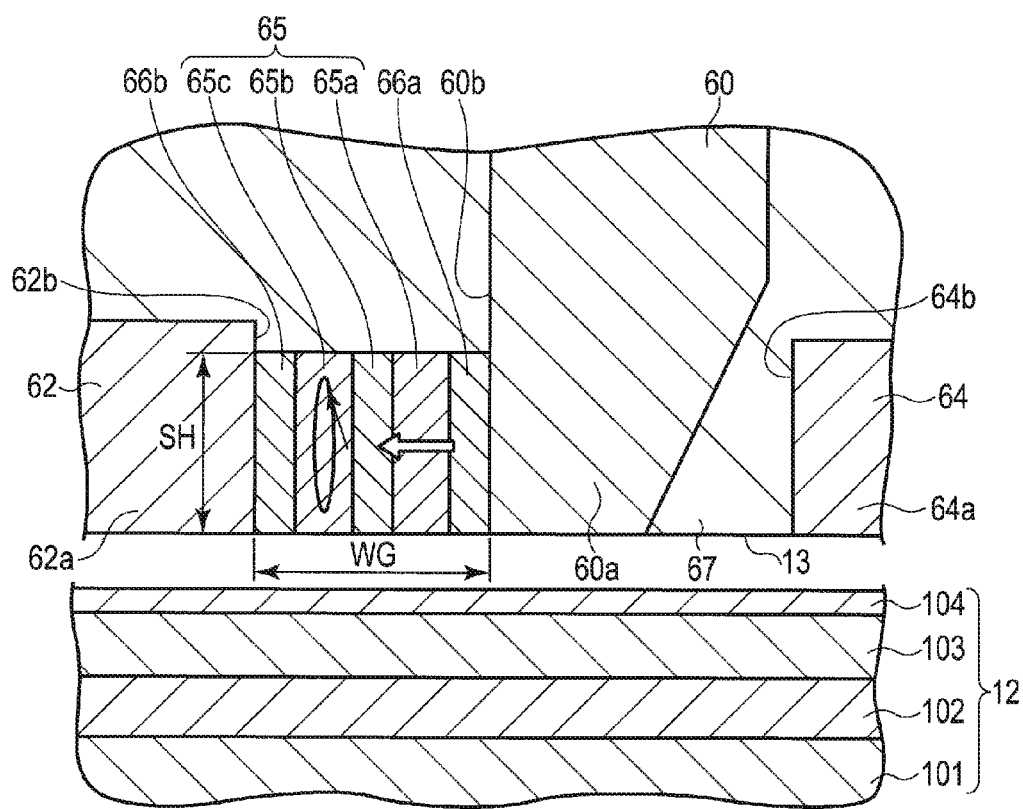
F I G. 4

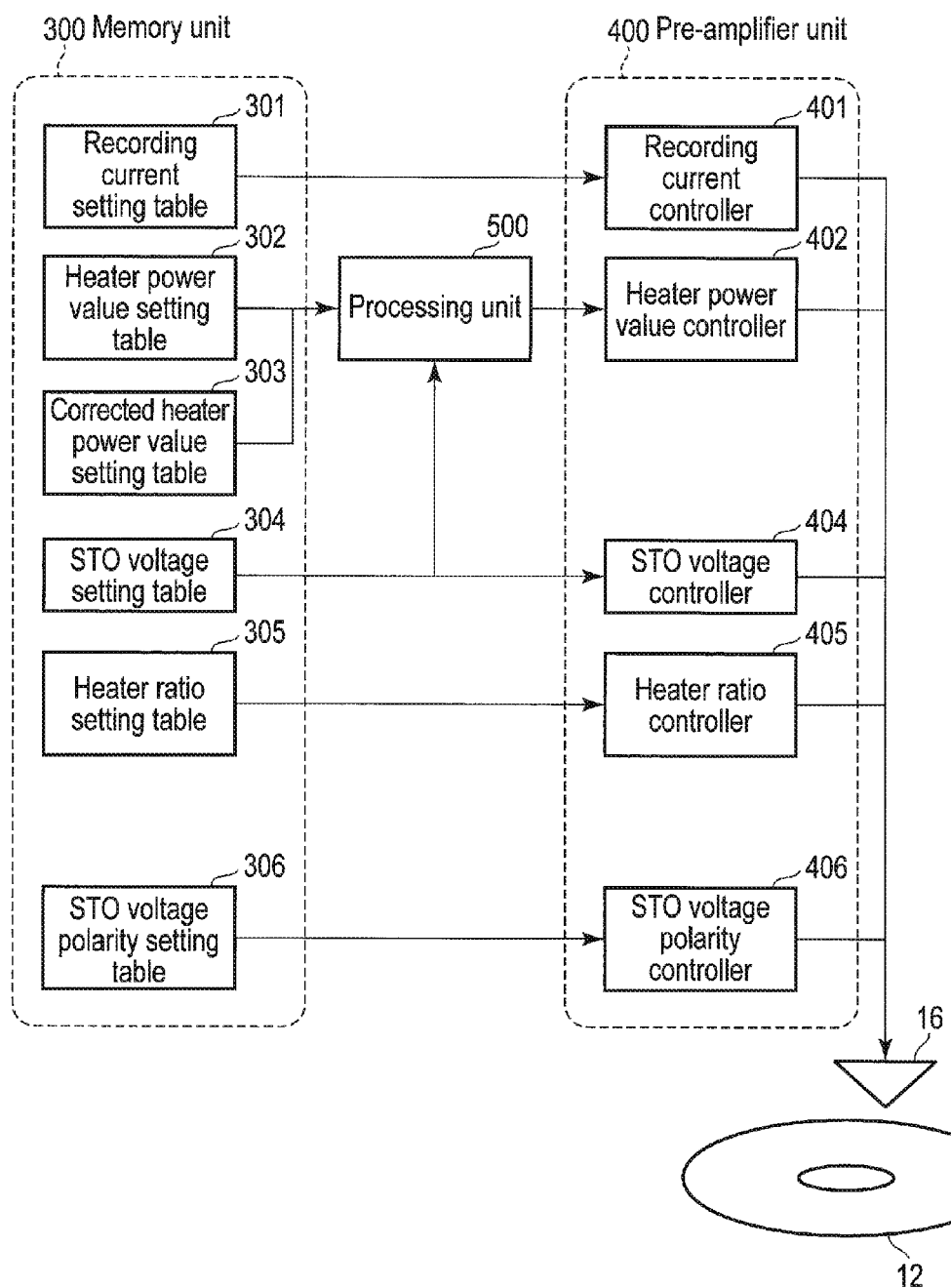
F I G. 5

| STO-Vb (dac) | Corrected optimum heater power value dPw (dac) | Heater power value setting at reproducing operation (dac) | Heater power value setting at recording operation vb off(dac) | Heater power value setting at recording operation Pw (dac) |
|---|---|---|---|---|
| 0 | 0 | 319 | 283 | 283 |
| 2 | 0 | 319 | 283 | 283 |
| 4 | 1 | 319 | 283 | 282 |
| 6 | 2 | 319 | 283 | 281 |
| 8 | 2 | 319 | 283 | 281 |
| 10 | 3 | 319 | 283 | 280 |
| 12 | 3 | 319 | 283 | 280 |
| 14 | 5 | 319 | 283 | 278 |
| 16 | 6 | 319 | 283 | 277 |
| 18 | 7 | 319 | 283 | 276 |
| 20 | 9 | 319 | 283 | 274 |
| 22 | 10 | 319 | 283 | 273 |
| 24 | 13 | 319 | 283 | 270 |
| 26 | 15 | 319 | 283 | 268 |
| 28 | 17 | 319 | 283 | 266 |
| 30 | 20 | 319 | 283 | 263 |
| 32 | 21 | 319 | 283 | 262 |

FIG. 8

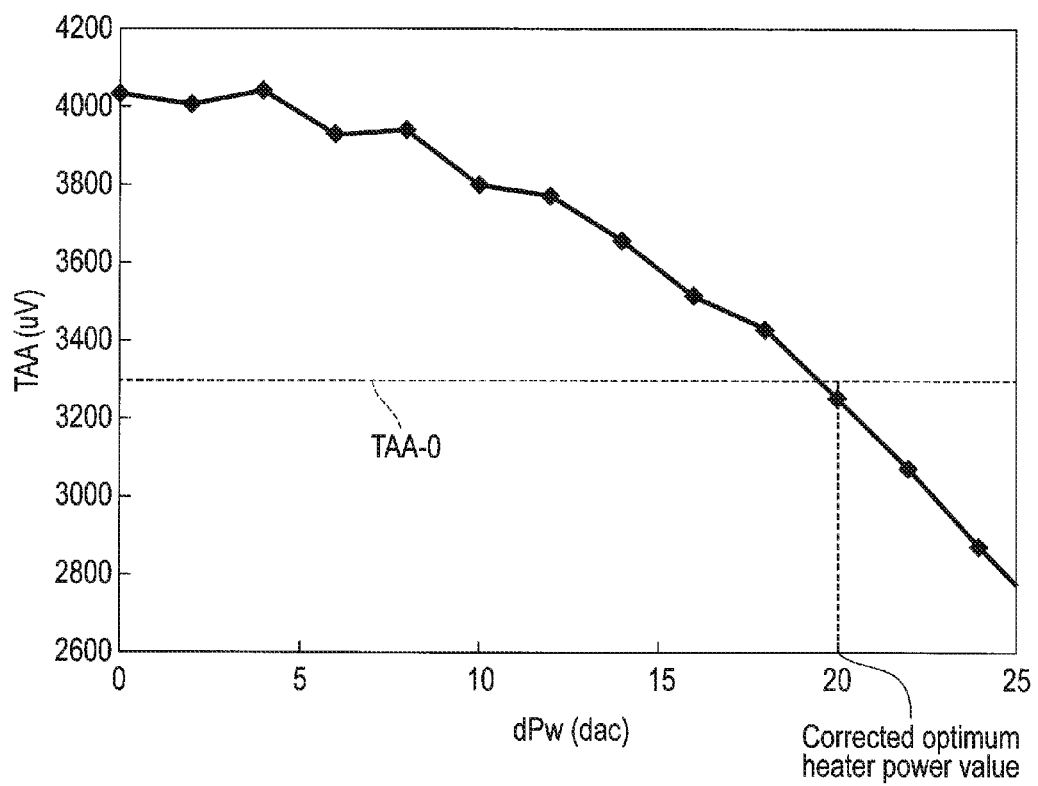
F I G. 11

US 10,014,009 B1

MAGNETIC DISK DRIVE AND RECORDING HEAD CONTROL METHOD

CROSS-REFERENCE TO RELATED APPLICATIONS

This application is based upon and claims the benefit of priority from Japanese Patent Application No. 2017-164470, filed Aug. 29, 2017, the entire contents of which are incorporated herein by reference.

FIELD

Embodiments described herein relate generally to a magnetic disk drive and a recording head control method using a vertical magnetic recording head.

BACKGROUND

In recent years, vertical magnetic recording has been adopted by a magnetic disk drive to increase the recording density and capacity of the device or to achieve miniaturization of the device. In the magnetic disk drive of this type, a recording head for vertical magnetic recording is made to face a recording surface of the magnetic disk comprising a recording layer for vertical magnetic recording, a vertical field corresponding to the recording data is generated in a predetermined area on the magnetic disk by the recording head, and the data is thereby recorded.

The recording head comprises a main magnetic pole which has a tapered portion formed of a soft magnetic metal and generates a vertical field, a return magnetic pole which is opposed to the main magnetic pole with a write gap sandwiched between the return magnetic pole and the main magnetic pole, urges a magnetic flux from the main magnetic pole to return and forms a magnetic circuit together with the main magnetic pole, and a coil which excites the magnetic flux to the magnetic circuit formed by the main magnetic pole and the return magnetic pole and generates a record field.

The recording head configured as explained above comprises a spin torque oscillator (STO) in the write gap to attempt improvement of the recording power. An example of the spin torque oscillator is, for example, a high-frequency oscillator or a permeability regulator.

If a drive voltage is applied to STO, however, STO may generate heat and cause a fine element bump. Since this bump is fine, the bump amount can hardly be detected and measured, and high-accuracy correction of the bump amount is difficult. For this reason, if the element bump caused by STO drive is larger than expected, a problem arises that the element life may be remarkably degraded due to contact with an abnormal protrusion of the recording medium.

The problem to be solved by the embodiments is to provide a magnetic disk drive and a recording head control method capable of suppressing element bump caused by the STO drive and implementing improvement of the recording density.

BRIEF DESCRIPTION OF THE DRAWINGS

FIG. 3 is an enlarged cross-sectional view schematically showing parts of a head portion of the magnetic head and parts of the magnetic disk.

FIG. 4 is an enlarged cross-sectional view schematically showing parts of a magnetic head top portion of the magnetic head and parts of the magnetic disk.

FIG. 5 is a block diagram showing a control system for correcting a heater power value in accordance with an STO voltage in the First Embodiment.

FIG. 8 is a table showing an example of the setting of the corrected heater power values in the First Embodiment.

Each of FIG. 9A

FIG. 11 is a characteristic graph showing a relationship between a heater power reduction amount at the STO voltage and an average track amplitude in the Second Embodiment.

DETAILED DESCRIPTION

Figure 1:
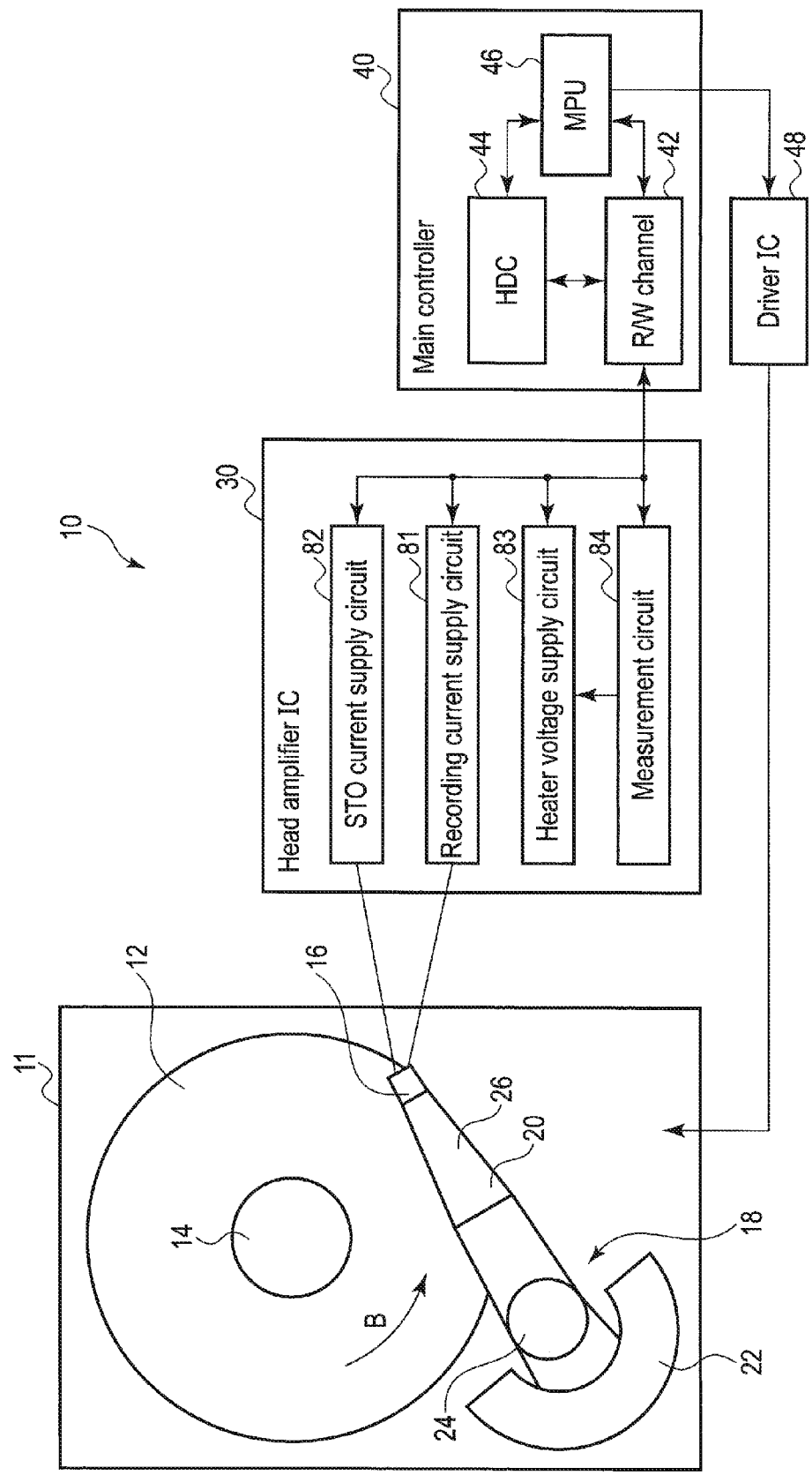
FIG. 1 is a block diagram schematically showing a magnetic disk drive (HDD) according to First Embodiment.

Embodiments will be described hereinafter with reference to the accompanying drawings.

In general, according to one embodiment, a magnetic disk drive includes a magnetic disk including a recording layer for vertical magnetic recording, a recording head generating a vertical recording field to be applied to the recording layer, a reproducing head reading and reproducing data subjected to the vertical magnetic recording from the recording layer and a controller controlling the recording head and the reproducing head. The recording head includes a main magnetic pole generating the vertical recording field, a return magnetic pole facing a distal portion of the main magnetic pole through a write gap, returning a magnetic flux from the main magnetic pole, and forming a magnetic circuit together with the main magnetic pole, a recording coil exciting the magnetic flux in the magnetic circuit formed by the main magnetic pole and the return magnetic pole a spin torque oscillator (STO) arranged in the write gap, an STO voltage supply circuit applying a voltage to the STO through the main magnetic pole and the return magnetic pole, and a heater adjusting a temperature of the recording head. The controller includes a referential characteristic value measuring unit recording and reproducing referential data in the recording layer and measuring a referential characteristic value, in a state in which supply of the voltage applied to the STO is stopped, a heater controller reducing a temperature set value of the heater at a recording operation, based on the referential characteristic value, a corrected characteristic value measuring unit recording and reproducing corrected data and measuring a corrected characteristic value, in a state of supplying the voltage to be applied to the STO with a polarity opposite to a polarity at a general operation, while varying the temperature set value of the heater at a recording operation of the heater controller a comparator comparing the referential characteristic value with the corrected characteristic value and obtaining a difference, and a correction unit correcting a reduction quantity of the temperature set value of the heater, based on the difference obtained from the comparator.

The disclosure is merely an example in the following explanations and proper changes in keeping with the spirit of the invention, which are easily conceivable by a person of ordinary skill in the art, come within the scope of the invention as a matter of course. In addition, in some cases, in order to make the description clearer, the widths, thicknesses, shapes and the like, of the respective parts are illustrated schematically in the drawings, rather than as an accurate representation of what is implemented. However, such schematic illustration is merely exemplary, and in no way restricts the interpretation of the invention. In addition, in the specification and drawings, the same elements as those described in connection with preceding drawings are denoted by like reference numbers, and detailed description thereof is omitted unless necessary.

First Embodiment

Figure 2:
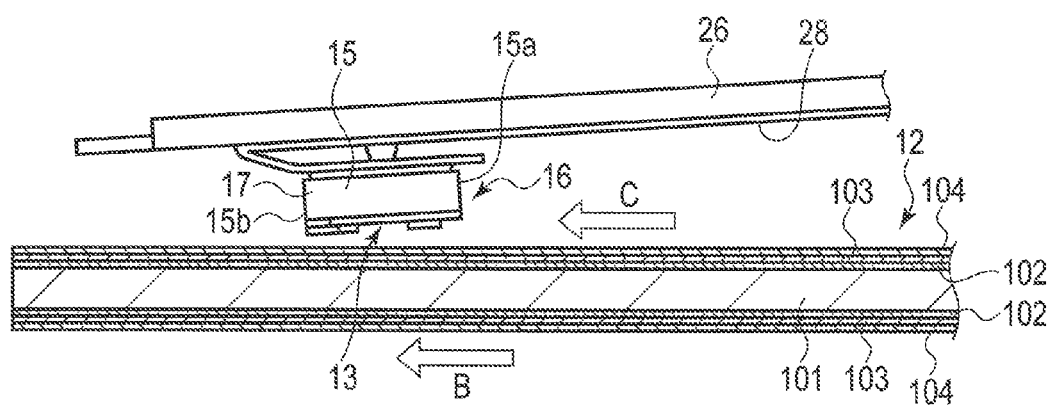
FIG. 2 is a side view showing a magnetic head, a suspension, and a recording medium of the HDD in the First Embodiment.

FIG. 1 is a block diagram schematically showing a hard disk drive (HDD) which is a magnetic disk drive according to the First Embodiment, FIG. 2 is a side view showing a magnetic head in a fly state and a magnetic disk, FIG. 3 is an enlarged cross-sectional view schematically showing parts of a head portion of the magnetic head and parts of the magnetic disk, FIG. 4 is an enlarged cross-sectional view schematically showing parts of a magnetic head top portion of the magnetic head and parts of the magnetic disk, and FIG. 5 is a block diagram showing a control system for correcting a heater power value in accordance with an STO voltage.

As shown in FIG. 1, an HDD 10 comprises a rectangular housing 11, a magnetic disk 12 serving as a recording medium arranged in the housing 11, a spindle motor 14 supporting and rotating the magnetic disk 12, and a plurality of magnetic heads 16 which write data to the magnetic disk 12 and read data from the magnetic disk 12. In addition, the HDD 10 comprises a head actuator 18 which moves and positions each of the magnetic heads 16 on an arbitrary track on the magnetic disk 12. The head actuator 18 comprises a suspension assembly 20 which supports the magnetic heads 16 to be movable and a voice coil motor (VCM) 22 which rotates the suspension assembly 20.

The HDD 10 comprises a head amplifier IC 30, a main controller 40 and a driver IC 48. The head amplifier IC 30 is provided on, for example, the suspension assembly 20 and is electrically connected to the magnetic heads 16. The main controller 40 and the driver IC 48 are constituted on, for example, a control circuit board (not shown) provided on a back surface side of the housing 11. The main controller 40 comprises an R/W channel 42, a hard disk controller (HDC) 44, and a microprocessor (MPU) 46. The main controller 40 is electrically connected to the head amplifier IC 30 and is also electrically connected to the VCM 22 and the spindle motor 14 via the driver IC 48. The HDD 10 can be connected to a host computer (not shown).

As shown in FIG. 1 and FIG. 2, the magnetic disk 12 is a perpendicular magnetic recording medium comprising a recording layer which has anisotropy perpendicular to the disk surface. More specifically, the magnetic disk 12 comprises, for example, a substrate 101 shaped in a disk having a diameter of approximately 2.5 inches (6.35 cm) and composed of a nonmagnetic material. A soft magnetic layer 102 serving as an under layer is formed on each of the surfaces of the substrate 101, and a magnetic recording layer 103 and a protective film 104 are successively stacked in this order on an upper layer part of the soft magnetic layer 102. The magnetic disk 12 is fitted coaxially to a hub of the spindle motor 14. The magnetic disk 12 is rotated at a predetermined speed in a direction of an arrow B by the spindle motor 14.

The suspension assembly 20 comprises a bearing portion 24 fixed to the housing 11 so as to be rotatable and a plurality of suspensions 26 extending from the bearing portion 24. As shown in FIG. 2, the magnetic heads 16 are supported by extending edges of the respective suspensions 26. The magnetic heads 16 are electrically connected to the head amplifier IC 30 via a wiring member 28 provided on the suspension assembly 20.

Next, the structure of the magnetic heads 16 will be explained in detail.

As shown in FIG. 2 and FIG. 3, each of the magnetic heads 16 is constructed as a fly-type head, and comprises a slider 15 substantially shaped as a rectangular parallelepiped and a head portion 17 formed at an outflow (trailing) side end of the slider 15. The slider 15 is formed from a sintered body of alumina and titanium carbide (AlTiC), and the head portion 17 is formed of a plurality of thin films.

The slider 15 comprises a rectangular air bearing surface (ABS) 13 opposite to the surface of the magnetic disk 12. The slider 15 is kept flying at a predetermined quantity from the surface of the magnetic disk 12, because of an airflow C produced between the disk surface and the ABS 13 by the rotation of the magnetic disk 12. The direction of the airflow C coincides with the direction of rotation B of the magnetic disk 12. The slider 15 has a leading edge 15a located on an entry side of the airflow C and a trailing edge 15b located on an exit side of the airflow C.

As shown in FIG. 3, the head portion 17 is a separation type magnetic head obtained by forming a reproducing head 54 and a recording head 58 at the trailing edge 15b of the slider 15 by a thin film process. To control the record/reproduce fly quantity of the head portion 17, a recording heater 19a is arranged on a deep side of the recording head 58, and a reproducing heater 19b is arranged on a deep side of the reproducing head 54.

The reproducing head 54 is composed of reproducing element 55 formed of a magnetic film which exhibits a magnetoresistive effect, and an upper shield 56 and a lower 57 obtained by arranging shield films on the trailing side and the leading side of the reproducing element 55 with a magnetic film sandwiched between the shields. Lower ends of the reproducing element 55, upper shield 56, and lower shield 57 are exposed to the ABS 13 of the slider 15. The magnetic heads 16 are electrically connected to the head amplifier IC 30 via a wiring member 28 provided on the carriage assembly 20.

The recording head 58 is arranged on the trailing edge 15b side of the slider 15 with respect to the reproducing head 54. The recording head 58 comprises a main magnetic pole 60 formed of a high-permeability material generating a recording field in a direction perpendicular to the surface of the magnetic disk 12, a return magnetic pole 62 which becomes a trailing shield (write shield or first shield), and a leading core 64 which becomes a reading shield (second shield). The main magnetic pole 60 and the return magnetic pole 62 form a first magnetic core which forms a magnetic path, and the main magnetic pole 60 and the leading core 64 form a second magnetic core which forms a magnetic path. The recording head 58 comprises a first coil (a recording coil) 70 wound around the first magnetic core and a second coil (a recording coil) 72 wound around the second magnetic core.

As shown in FIG. 3 and FIG. 4, the main magnetic pole 60 extends in the direction substantially perpendicular to the surface of the magnetic disk 12. A distal portion 60a of the main magnetic pole 60 on the magnetic disk 12 side is tapered toward the disk surface and, for example, its section is formed in a trapezoidal shape. The front end surface of the main magnetic pole 60 is exposed to the ABS 13 of the slider 15. The width of a trailing side end surface 60b of the distal portion 60a substantially corresponds to the width of the tracks on the magnetic disk 16.

The return magnetic pole 62 formed of the soft magnetic material is arranged on the tailing side of the main magnetic pole 60 and is provided to efficiently close the magnetic path via the soft magnetic layer 102 of the magnetic disk 12 directly under the main magnetic pole 60. The return magnetic pole 62 is formed in a substantially L-letter shape, and includes a first connection portion 50 connected to the main magnetic pole 60. The first connection portion 50 is connected to an upper part of the main magnetic pole 60, i.e., a portion distant from the ABS 13 of the main magnetic pole 60, via a nonconductive material 52.

The distal portion 62a of the return magnetic pole 62 is formed in an elongated rectangular shape, and its front end surface is exposed to the ABS 13 of the slider 15. A leading side end surface 62b of the distal portion 62a extends in the width direction of the tracks of the magnetic disk 12, and extends approximately perpendicularly to the ABS 13. The leading side end surface 62b is opposed in parallel to the trailing side end surface 60b of the main magnetic pole 60 via a write gap WG.

The first coil 70 is arranged to be wound around a magnetic circuit (first magnetic core) comprising the main magnetic pole 60 and the return magnetic pole shield 62. The first coil 70 is wound around, for example, the first connection portion 50. When writing a signal to the magnetic disk 12, the first coil 70 excites the main magnetic pole 60 and urges a magnetic flux to flow to the main magnetic pole 60 by urging a recording current to flow to the first coil 70.

As shown in FIG. 4, an STO 65 is provided between the distal portion 60a of the main magnetic pole 60 and the return magnetic pole 62 inside the write gap WG and is partially exposed to the ABS 13. If the STO 65 is, for example, a high-frequency oscillator, the STO 65 is composed of three layers, i.e., a spin injection layer (Pin layer) 65a, a middle layer 65b, and an oscillation layer 65c, and the oscillation layer 65c oscillates and magnetizes by receiving a spin torque from the spin injection layer 65a, at the STO voltage drive.

A lower end surface of the STO 65 may be separated from the ABS 13 upwardly in the height direction, in not only a case where the lower end surface is flush with the ABS 13, but the other cases. In addition, layer surfaces or film surfaces of the spin injection layer 65a, the middle layer 65b, and the oscillation layer 65c may be formed to be inclined to the direction perpendicular to the ABS 13.

As shown in FIG. 3, connection terminals 91 and 92 are connected to the main magnetic pole 60 and the return magnetic pole 62, respectively, and the connection terminals 91 and 92 are connected to the head amplifier IC 30 via interconnects. The current circuit is thereby constituted to enable a current to pass serially from the head amplifier IC 30 through the main magnetic pole 60, the conductive body 65, and the return magnetic pole 62. In addition, connection terminals 97 and 98 are connected to the recording heater 19a and the reproducing heater 19b, respectively, and the connection terminals 97 and 98 are connected to the head amplifier IC 30 via interconnects.

As shown in FIG. 3 and FIG. 4, the leading core 64 formed of a soft magnetic material is opposed to the main pole 60 on the leading side of the main magnetic pole 60. The leading core 64 is formed in a substantially L-letter shape, and a distal portion 64a on the magnetic disk 12 side is formed in an elongated rectangular shape. The front end surface (lower end surface) of the distal portion 64a is exposed to the ABS 13 of the slider 15. The trailing side end surface 64b of the distal portion 64a extends in the width direction of the tracks of the magnetic disk 12. The trailing side end surface 64b is opposed to the leading side end surface of the main magnetic pole 60 through a gap. The gap is covered with a protective insulating film 76 serving as a nonmagnetic material.

The leading core 64 comprises a second connection portion 68 joined to a back gap between the leading core 64 and the main magnetic pole 60 at a position remote from the magnetic disk 12. The second connection portion 68 is formed of, for example, a soft magnetic material, and forms a magnetic circuit together with the main magnetic pole 60 and the leading core 64. The second coil 72 of the recording head 58 is arranged to be wound around a magnetic circuit (second magnetic core) comprising the main magnetic pole 60 and the leading core 64, and applies a magnetic field to the magnetic circuit. The second coil 72 is wound around, for example, the second connection portion 68. A nonconductive material or a nonmagnetic material may be inserted into a part of the second connection portion 68.

The second coil 72 is wound around in a direction opposite to the winding direction of the first coil 70. The first coil 70 and the second coil 72 are connected to terminals 95 and 96, respectively, and the terminals 95 and 96 are connected to the head amplifier IC 30 via interconnects. The second coil 72 may be connected serially with the first coil 70. In addition, the first coil 70 and the second coil 72 may control current supply separately from each other. The currents supplied to the first coil 70 and the second coil 72 are controlled by the head amplifier IC 30 and the main controller 40.

As shown in FIG. 4, the recording head 58 further comprises a pair of side shields 67 arranged to have gaps on both sides of the main magnetic pole 60 in the width direction. In the present embodiment, the side shields 67 are formed integrally with the return magnetic pole 62 and the leading core 64, and the distal portion 60a of the main magnetic pole 60 and the write gap WG are surrounded by the side shields 67.

In the above-explained recording head 58, the soft magnetic material constituting the main magnetic pole 60, the return magnetic pole 62, the leading core 64, and the side shields 67 can be selected from alloys or compounds containing at least one of Fe, Co, and Ni.

As shown in FIG. 3, the reproducing head 54 and the recording head 58 are covered with the protective insulating film 76 except the portions exposed to the ABS 13 of the slider 15. The protective insulating film 76 constitutes an outer shape of the head portion 17.

As shown in FIG. 1, the head amplifier IC 30 driving the magnetic head 16 and the recording head 58, as constituted as explained above, comprises a recording current supply circuit 81 which supplies a recording current to the first coil 70 and the second coil 72 via connection terminals 95 and 96, an STO current supply circuit 82 which supplies an STO voltage to the STO 75 via interconnects (not shown) and the connection terminals 91 and 92, a heater voltage supply circuit 83 which supplies a heater voltage to the recording heater 19a and the reproducing heater 19b via interconnects (not shown) and the connection terminals 97 and 98, and a measurement circuit 84 which measures and compares error rates of data recorded in the magnetic disk 12. Furthermore, although not shown, the head amplifier IC 30 comprises a timing operator (not shown) which controls the time and timing to pass a current to the recording current supply circuit 81 and which controls the time and timing to apply a voltage to the STO current supply circuit 82, and a recording current waveform generator (not shown) which generates a recording current waveform in accordance with a record pattern signal generated by the R/W channel 42.

At the operation of the HDD 10, the main controller 40 drives the spindle motor 14 by the driver IC 48 and rotates the magnetic disk 12 at a predetermined speed, under control of the MPU 46. In addition, the main controller 40 drives the VCM 22 by the driver IC 48, and moves and positions the magnetic heads 16 onto a desired track of the magnetic disk 12.

At the recording, the recording current supply circuit 81 of the head amplifier IC 30 supplies a recording current (AC) to the first coil 70 and the second coil 72 (hereinafter called recording coils) in accordance with the record signal generated from the R/W channel 42 and the recording pattern. The first coil 70 and the second coil 72 thereby energize the main magnetic pole 60, and the main magnetic pole 60 generates the record field. The STO current supply circuit 82 applies the STO voltage to the main magnetic pole 60 and the return magnetic pole 62 under control of the MPU 46, and thereby serially energizes the interconnects, the connection terminals 91 and 92, the main magnetic pole 60, the STO 65, and the return magnetic pole 62. The heater voltage supply circuit 83 and the measurement circuit 84 are subjected to measurement of the recording data error rate of the measurement circuit 84 and the temperature management of the recording heater 19a based on the measurement result, under control of the MPU 46.

The operations of the magnetic disk drive constituted as explained above will be explained with reference to FIG. 5 to FIG. 9.

FIG. 5 shows a control block correcting the record fly quantity at the STO drive in the present embodiment. Constitution of the control block is implemented by a memory unit 300, a pre-amplifier unit 400, and a processing unit 500 in the MPU 46. The memory unit 300 comprises a recording current setting table 301, a heater power value setting table 302, a corrected heater power value setting table 303, an STO voltage setting table 304, a heater ratio setting table 305, and an STO voltage polarity setting table 306. The pre-amplifier unit 400 comprises a recording current controller 401, a heater power value controller 402, an STO voltage controller 404, a heater ratio controller 405, and an STO voltage polarity controller 406. The processing unit 500 operates a heater power value.

If recording is executed by applying the STO voltage, the STO voltage is applied from the STO voltage controller 404 in the pre-amplifier unit 400 to the STO 65 through the STO voltage supply circuit 82, based on the set value of the STO voltage setting table 304 stored in the memory unit 300. At this time, with respect to the setting of the power of the recording heater, not only the heater power setting table 302 preliminarily optimized in a state of STO voltage OFF, but the corrected heater power value setting table 303 according to the STO voltage are newly formed, and the corrected heater power value is operated based on the heater power value setting table 302, the corrected heater power value setting table 303, and the STO voltage setting table 304. After that, the heater power value at application of the STO voltage is designated based on the operation value, by the heater power value controller 402. A ratio of a first heater power set value to a second heater power set value, i.e., a heater ration is set to be constant irrespective of the STO voltage, but the heater ratio may be corrected in some cases.

Figure 6:
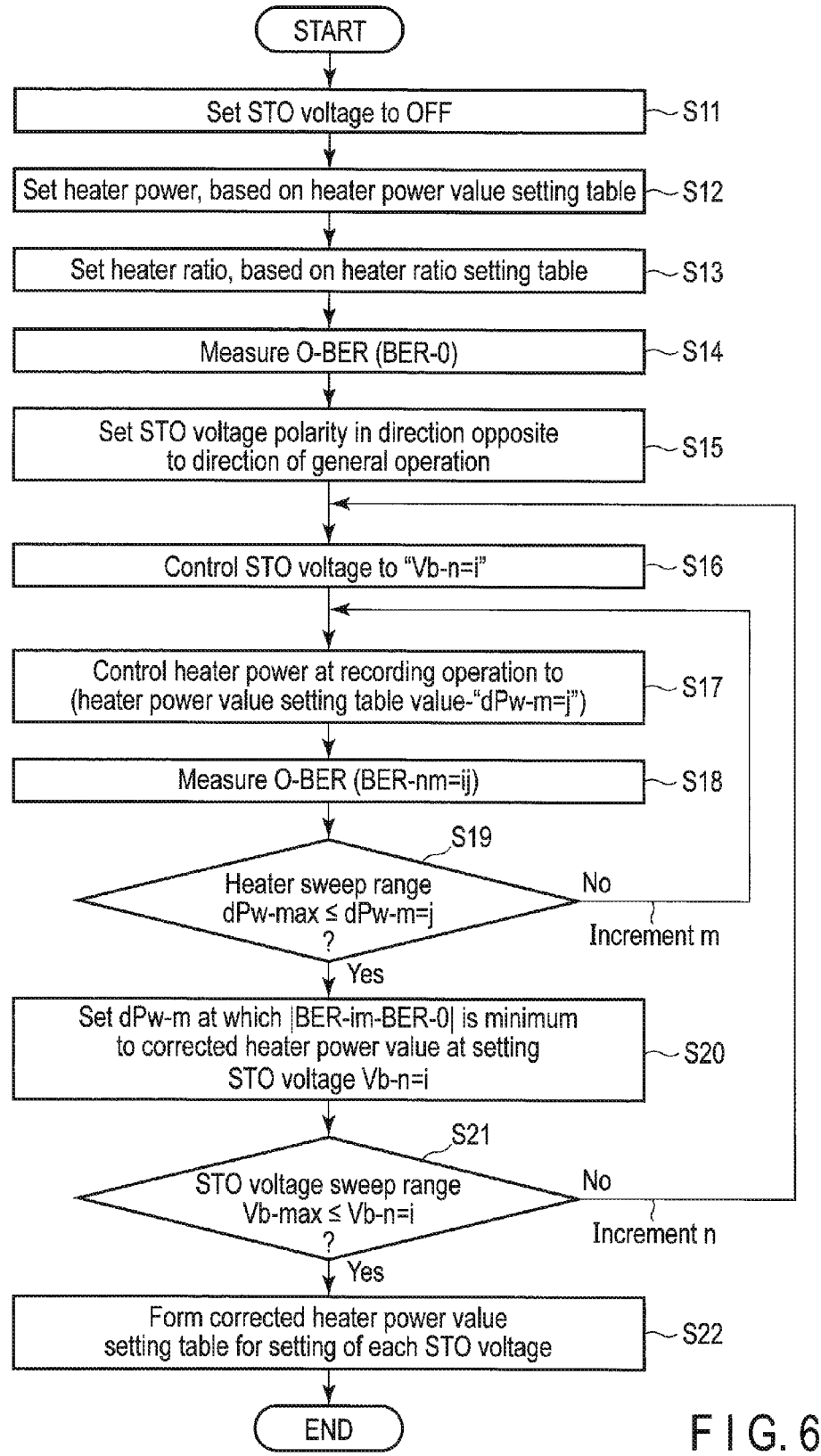
FIG. 6 is a flowchart for forming a setting table of the corrected heater power value for the STO voltage in the First Embodiment.
Figure 7:
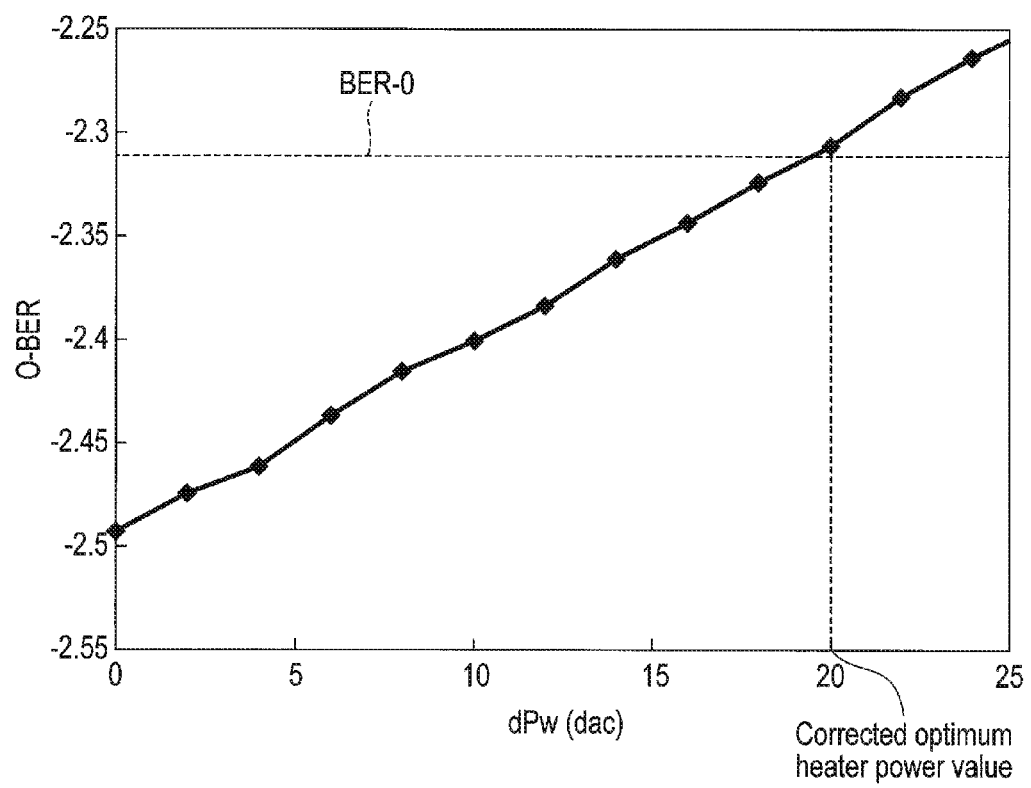
FIG. 7 is a characteristic graph showing a relationship between a heater power reduction amount at the STO voltage and a bit error rate in the First Embodiment.
Figure 9A:
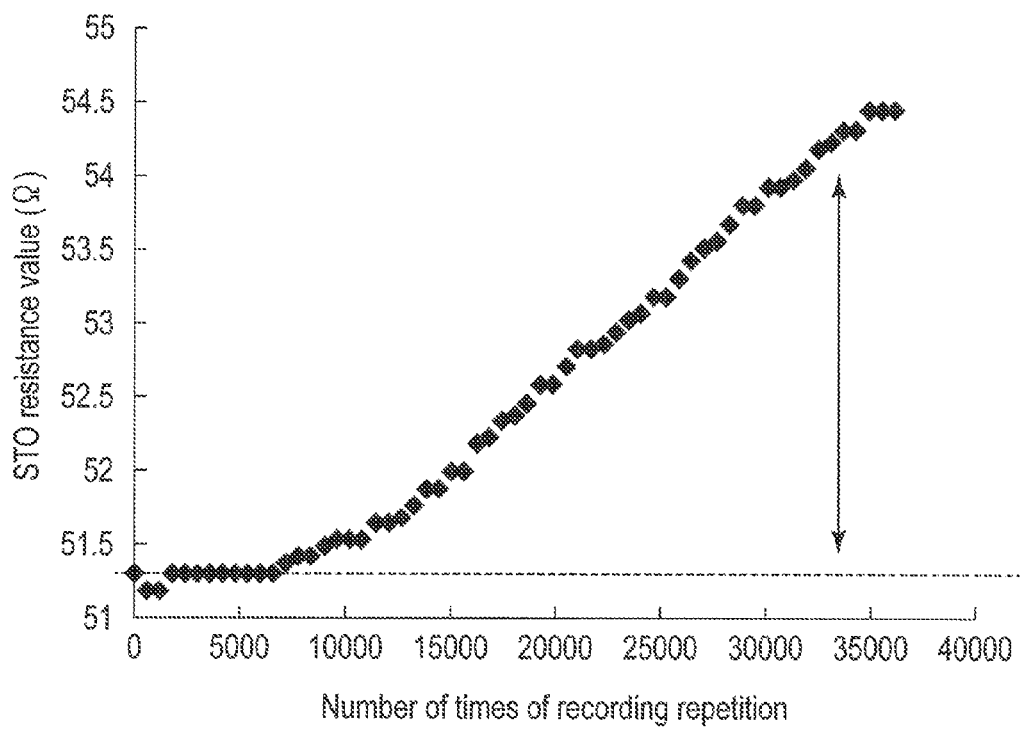
FIG. 9B is a characteristic graph showing element resistance change of STO to explain element life improvement effect resulting from application of the First Embodiment.
Figure 9B:
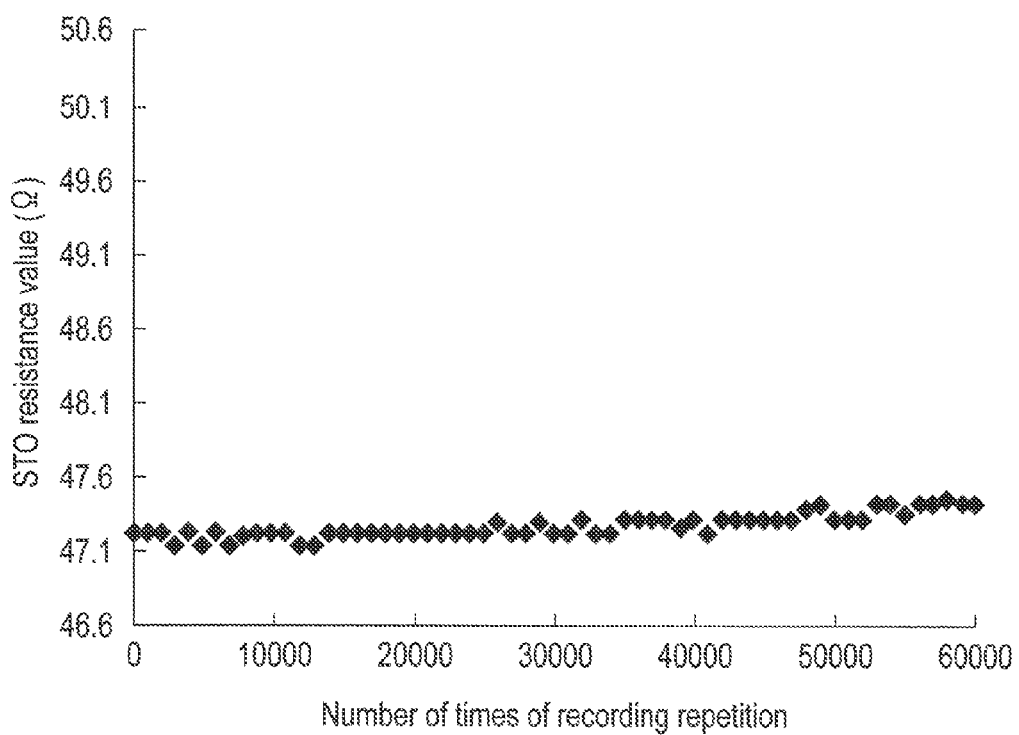

More specifically, processing of forming the corrected heater power value setting table according to the STO voltage will be explained with reference to FIG. 6 to FIG. 9A and FIG. 9B. FIG. 6 is a flowchart for forming the setting table of the corrected heater power value for the STO voltage, FIG. 7 is a characteristic graph showing a relationship between the heater power reduction quantity and BER at the STO voltage, FIG. 8 is a table showing an example of the corrected heater power value setting table, and FIG. 9A and FIG. 9B are graphs for explanation of the element life improvement effect according to the present embodiment.

In FIG. 6, first, the STO voltage is set to be off state (step S11), the heater power value optimized based on the heater power value setting table 302 is set (step S12), the heater ratio is set based on the heater ratio setting table 305 (step S13), and ontrack bit error rate (hereinafter O-BER) BER-0 of the reference data is measured (step S14). After that, a status in which an influence of heat generation caused by a pure STO voltage is received is preliminarily simulated by setting the polarity of the STO polarity in a direction opposite to the direction in which the element originally oscillates (step S15). Next, the STO voltage is controlled at (Vb-n=i) (step S16), the heater power at the recording operation is controlled at (heater power setting table value—"dPw-m=j") (step S17), O-BER is thereby measured (BER-nm=ij) while gradually lowering the heater power relative to O-BER measurement value BER-0 of the reference data (step S18), and correlation of O-BER to the heater power reduction quantity dPw as shown in FIG. 7 is confirmed.

It is determined whether the heater power value falls within a heater sweep range (dPw-max≤dPw-m=j) or not (step S19) and, if the value does not fall within the range (No), m is incremented and the flow returns to step S17 and, if the heater power value falls within the heater sweep range (Yes), dPw-m at which an absolute value of BER-im−BER-0 becomes minimum is registered as the corrected heater value at setting the STO voltage (Vb-n=i) (step S20). Next, it is determined whether the STO voltage falls within the sweep range (Vb-max≤Vb-n=i) or not (step S21) and, if the voltage does not fall within the range (No), n is incremented and the flow returns to step S16 and, if the STO voltage falls within the sweep range (Yes), the corrected heater power value setting table 303 for each STO voltage setting is formed (step S22) and a sequence of the processing is ended. Thus, the heater power value controller 402 controls the heater temperature set value at the recording operation to be lower than at least a general set value (corrected optimum heater power value shown in FIG. 7) at non-driving of the STO voltage, at measurement of the corrected characteristic value.

As explained above, the present embodiment measures O-BER while gradually lowering the heater power to O-BER measurement result BER-0 of the reference data, confirms the correlation of O-BER to the hearer power reduction quantity dPw, and sets the heater power reduction quantity dPw, which is the closest BER to the O-BER measurement value BER-0 of the first measured reference data, as the corrected optimum heater power value at application of the STO voltage. By executing such adjustment while varying the STO voltage, the table 303 of the corrected optimum heater power value for the STO voltage as shown in FIG. 8 can be formed. BER is used as an index of the characteristic value, but an index such as a signal-to-noise ratio (SNR) or an over write characteristic may be used.

Next, an effect of applying the present embodiment will be explained. An element resistance change of the STO 65 at repetition of the recording operation while driving the STO 65 is shown in FIG. 9A and FIG. 9B. FIG. 9A shows a case where the heater power value is not corrected with respect to the STO voltage. In this case, since the element bump caused by application of the STO voltage cannot be corrected, a situation that when the recording operation continues to some extent the resistance value gradually rises and the element becomes degraded can be understood. In contrast, with respect to application of the present embodiment shown in FIG. 9B, since the heater power value is corrected with respect to the STO voltage, it can be understood that the variation in the element resistance value at repetition of the recording operation is remarkably suppressed and the element life is remarkably improved. By thus correcting the heater power in accordance with the STO voltage, correction of the element bump caused by application of the STO voltage which has been impossible in prior art can be implemented and a risk that STO and its proximate site contact the medium surface can be reduced.

Second Embodiment

Figure 10:
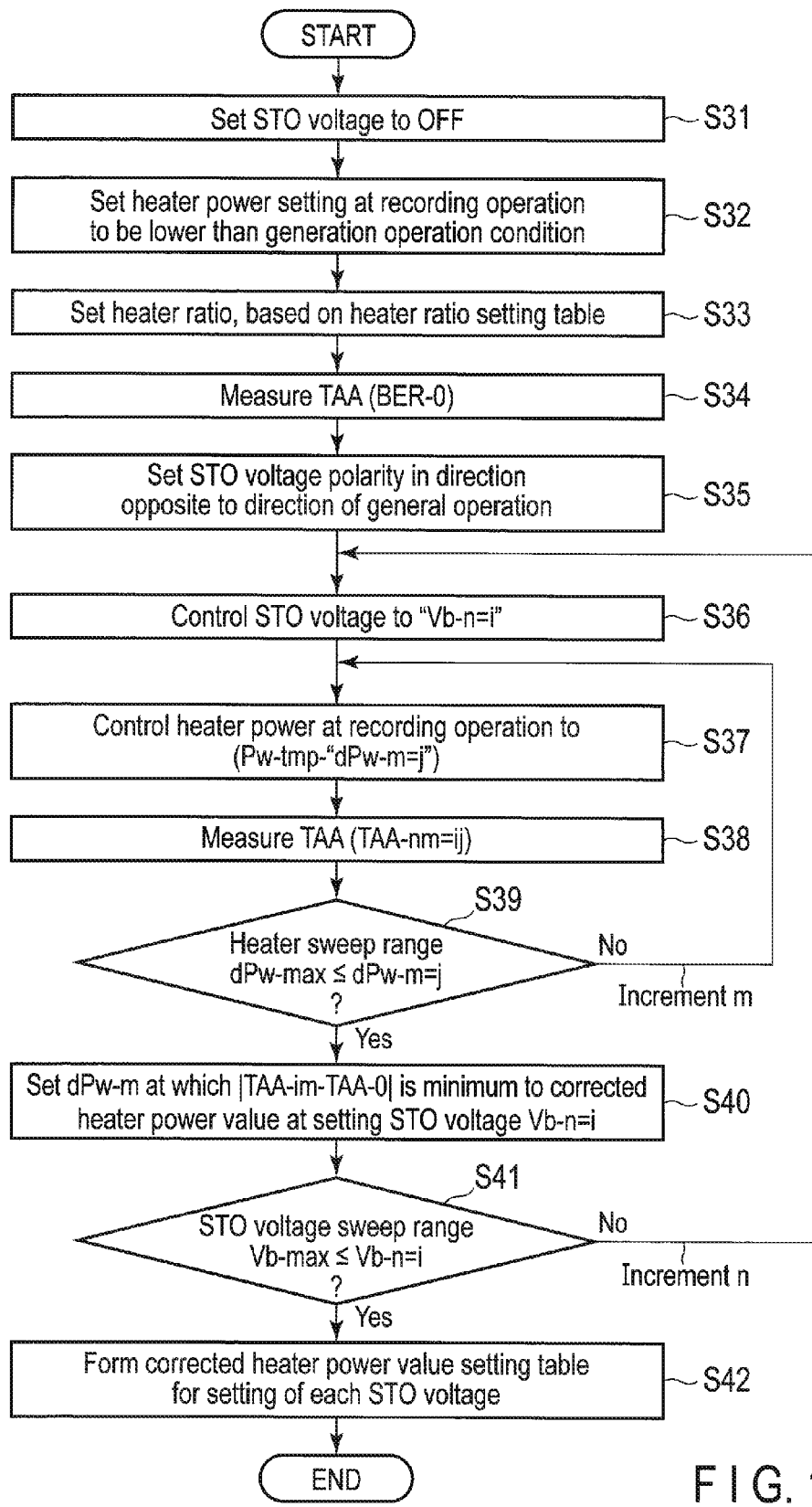
FIG. 10 is a flowchart for forming a corrected heater power value setting table for an STO voltage in Second Embodiment.

FIG. 10 shows a flowchart of finding a corrected heater quantity more easily with a higher accuracy as the Second Embodiment. First, an STO voltage is set to be off state (step S31), a heater power value at a recording operation is set to be lower than that under conditions of a general operation, based on a heater power value setting table 302 (step S32), a heater ratio is set based on a heater ratio setting table 305 (step S33), and a track average amplifier (hereinafter TAA) TAA-0 of reference data is measured (step S34). After that, a status in which an influence of heat generation caused by a pure STO voltage is received is preliminarily simulated by setting the polarity of the STO polarity in a direction opposite to the direction in which the element originally oscillates (step S35). Next, the STO voltage is controlled at (Vb-n=i) (step S36), the heater power at the recording operation is controlled at (Pw-tmp—"dPw-m=j") (step S37), TAA is thereby measured (TAA-nm=ij) while gradually lowering the heater power relative to measurement value TAA-0 of the track average amplifier TAA of the reference data (step S38), and correlation of the track average amplifier TAA to the heater power reduction quantity dPw as shown in FIG. 11 is confirmed.

It is determined whether the heater power value falls within a heater sweep range (dPw-max≤dPw-m=j) or not (step S39) and, if the value does not fall within the range (No), m is incremented and the flow returns to step S37 and, if the heater power value falls within the heater sweep range (Yes), dPw-m at which an absolute value of BER-im−TAA-0 becomes minimum is registered as the corrected heater value at setting the STO voltage (Vb-n=i) (step S40). Next, it is determined whether the STO voltage falls within the sweep range (Vb-max≤Vb-n=i) or not (step S41) and, if the voltage does not fall within the range (No), n is incremented and the flow returns to step S36 and, if the STO voltage falls within the sweep range (Yes), the corrected heater power value setting table 303 for each STO voltage setting is formed (step S42) and a sequence of the processing is ended.

By executing such adjustment while varying the STO voltage, the table 303 of the corrected optimum heater value for the STO voltage as shown in FIG. 8 can be formed. Unlike BER, SNR, over write characteristic and the like, the track average amplifier TAA can easily be measured and, if the value is set in a state in which the record fly quantity is high such that the medium magnetization is not saturated, the sensitivity at heater change is high and bump correction at application of the STO voltage can be executed with a higher accuracy.

Thus, the magnetic disk drive according to the present embodiment can execute correction of the element bump caused by application of the STO voltage, which has been impossible in prior art, and reduce a risk that STO and its proximate site contact the medium surface, by correcting the heater power reduction quantity in accordance with the STO voltage.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:
1. A magnetic disk drive, comprising:
a magnetic disk including a recording layer for vertical magnetic recording;
a recording head generating a vertical recording field to be applied to the recording layer;
a reproducing head reading and reproducing data subjected to the vertical magnetic recording from the recording layer; and
a controller controlling the recording head and the reproducing head,
wherein
the recording head includes:
a main magnetic pole generating the vertical recording field;
a return magnetic pole facing a distal portion of the main magnetic pole through a write gap, returning a magnetic flux from the main magnetic pole, and forming a magnetic circuit together with the main magnetic pole;
a recording coil exciting the magnetic flux in the magnetic circuit formed by the main magnetic pole and the return magnetic pole;
a spin torque oscillator (STO) arranged in the write gap;
an STO voltage supply circuit applying a voltage to the STO through the main magnetic pole and the return magnetic pole; and
a heater adjusting a temperature of the recording head, and
the controller includes:
a referential characteristic value measuring unit recording and reproducing referential data in the recording layer and measuring a referential characteristic value, in a state in which supply of the voltage applied to the STO is stopped;
a heater controller reducing a temperature set value of the heater at a recording operation, based on the referential characteristic value;
a corrected characteristic value measuring unit recording and reproducing corrected data and measuring a corrected characteristic value, in a state of supplying the voltage to be applied to the STO with a polarity opposite to a polarity at a general operation, while varying the temperature set value of the heater at a recording operation of the heater controller;

a comparator comparing the referential characteristic value with the corrected characteristic value and obtaining a difference; and a correction unit correcting a reduction quantity of the temperature set value of the heater, based on the difference obtained from the comparator.

2. The magnetic disk drive of claim 1, wherein
the heater controller controls the temperature set value of the heater at the recording operation to be lower than at least a general set value at non-driving time of the voltage to be applied to the STO, when measuring the corrected characteristic value.

3. The magnetic disk drive of claim 1, wherein
each of the referential characteristic value and the corrected characteristic value is any one of a bit error rate (BER), a signal-to-noise ratio (SNR), a track average amplifier (TAA), and an over write characteristic.

4. The magnetic disk drive of claim 1, wherein
the corrector sets the reduction quantity of the temperature set value of the heater at which the difference obtained from the comparator becomes minimum to a corrected quantity of the temperature set value of the heater at supplying the voltage to the STO.

5. A method of controlling a recording head of a magnetic disk drive, the method comprising:

if a magnetic disk drive comprises:

a recording head opposed to a magnetic disk including a recording layer for vertical magnetic recording and generating a vertical recording field to be applied to the recording layer;

a main magnetic pole generating the vertical recording field;

a return magnetic pole facing a distal portion of the main magnetic pole through a write gap, returning a magnetic flux from the main magnetic pole, and forming a magnetic circuit together with the main magnetic pole;

a recording coil exciting the magnetic flux in the magnetic circuit formed by the main magnetic pole and the return magnetic pole;

a spin torque oscillator (STO) arranged in the write gap;

an STO voltage supply circuit applying a voltage to the STO through the main magnetic pole and the return magnetic pole; and a heater adjusting a temperature of the recording head, recording and reproducing referential data in the recording layer and measuring a referential characteristic value, in a state in which supply of the voltage applied to the STO is stopped;

executing control of reducing a temperature set value of the heater at a recording operation, based on the referential characteristic value;

recording and reproducing corrected data and measuring a corrected characteristic value, in a state of supplying the voltage to be applied to the STO with a polarity opposite to a polarity at a general operation, while varying the temperature set value of the heater at a recording operation of the heater controller;

comparing the referential characteristic value with the corrected characteristic value and obtaining a difference; and correcting a reduction quantity of the temperature set value of the heater, based on the difference obtained from the comparator.

6. The method of claim 5, wherein
the control of the heater controls the temperature set value of the heater at the recording operation to be lower than at least a general set value at non-driving time of the voltage to be applied to the STO, when measuring the corrected characteristic value.

7. The method of claim 5, wherein
each of the referential characteristic value and the corrected characteristic value is any one of a bit error rate (BER), a signal-to-noise ratio (SNR), a track average amplifier (TAA), and an over write characteristic.

8. The method of claim 5, wherein
the correction of the reduction quantity of the temperature set value of the heater sets the reduction quantity of the temperature set value of the heater at which the difference obtained from the comparison between the referential characteristic value and the corrected characteristic value becomes minimum to a corrected quantity of the temperature set value of the heater at supplying the voltage to the STO.

* * * * *